July 26, 1955 F. S. AJERO 2,713,836
APPARATUS FOR DEPTH PLACEMENT OF SEEDS AND FERTILIZER
Filed April 11, 1951 4 Sheets-Sheet 1
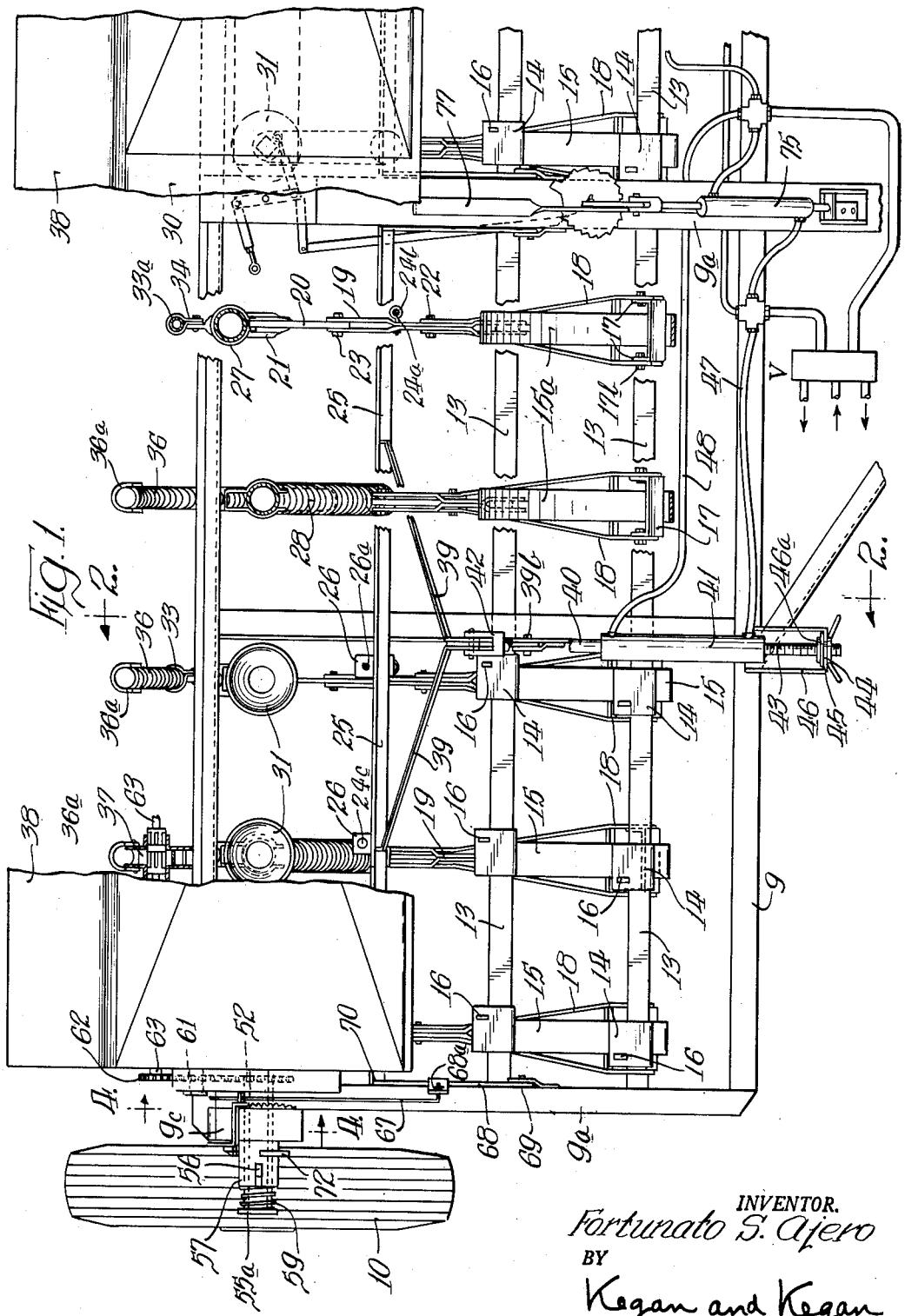
INVENTOR.
Fortunato S. Ajero
BY
Kegan and Kegan
Attys.

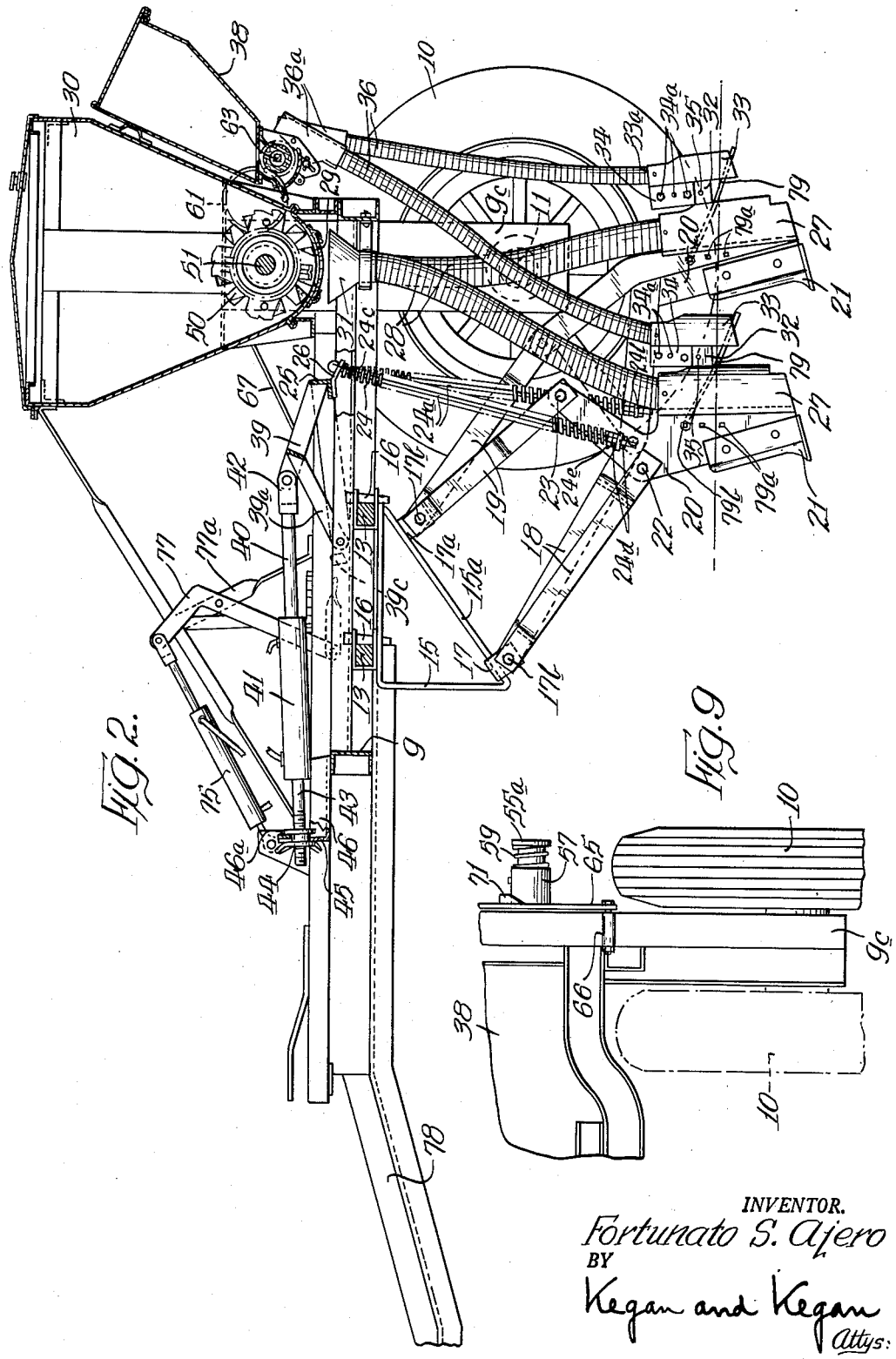

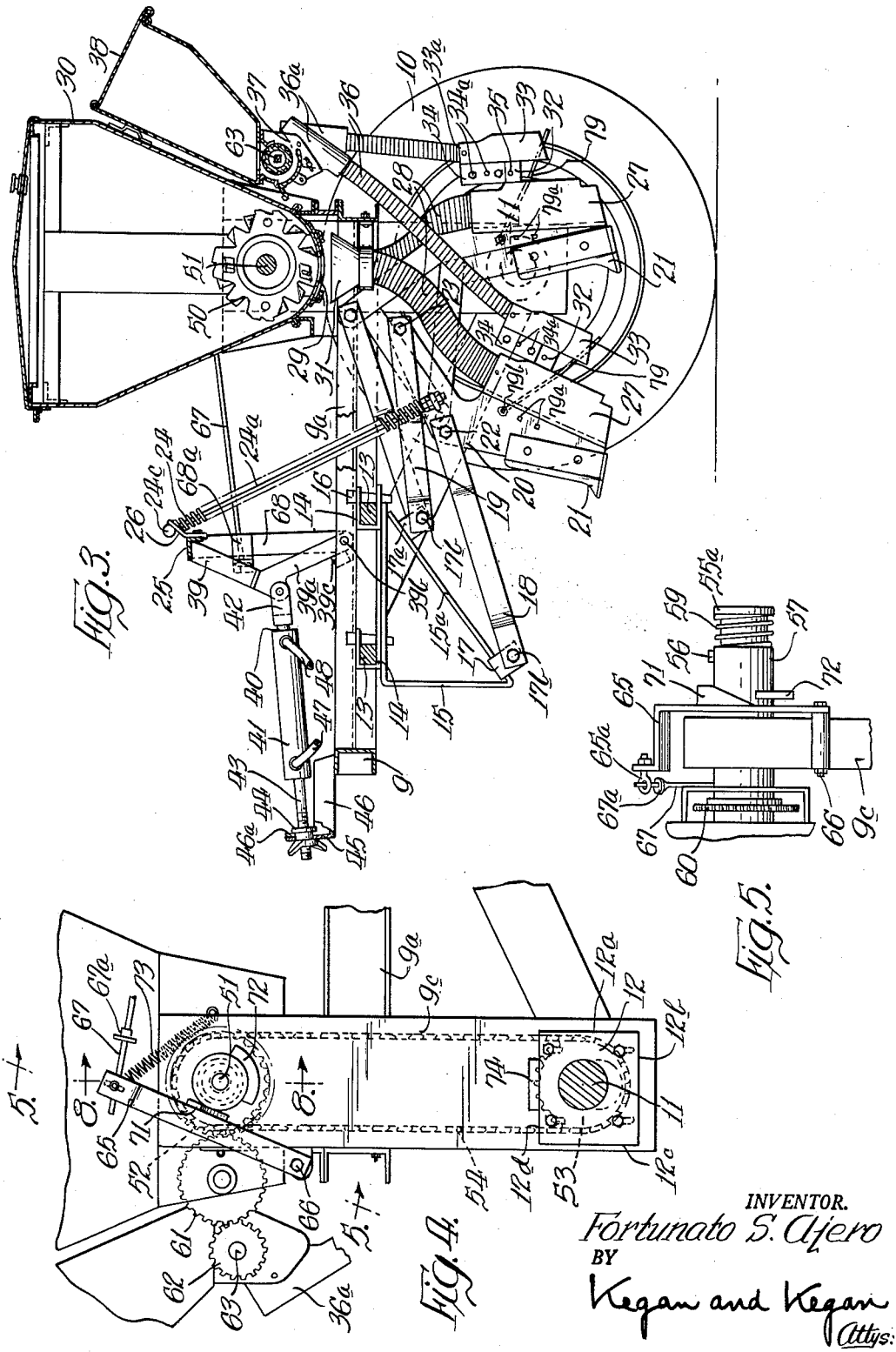

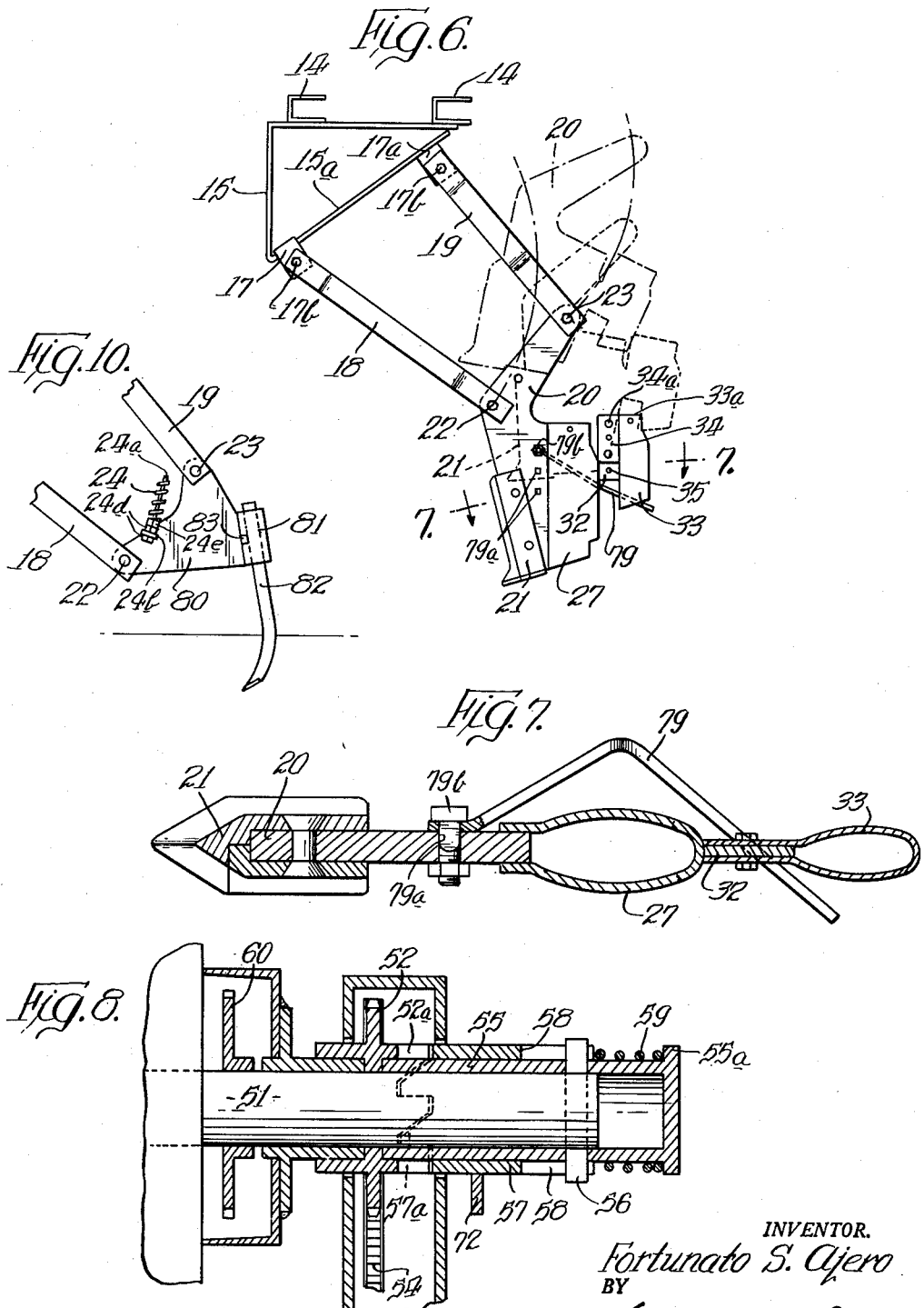

United States Patent Office 2,713,836
Patented July 26, 1955

2,713,836

APPARATUS FOR DEPTH PLACEMENT OF SEEDS AND FERTILIZER

Fortunato S. Ajero, Chicago, Ill., assignor, by mesne assignments, to Avco Manufacturing Corporation, New York, N. Y., a corporation of Delaware Application April 11, 1951, Serial No. 220,500

4 Claims. (Cl. 111—80)

This invention relates to agricultural implements of the depth placement type, which distribute fertilizer and simultaneously sow seeds. More particularly, my invention concerns itself with depth placement apparatus in which the shovels can readily be adjusted to obtain the desired furrow spacing and desired depths; and in which the shovels are supported in such a manner as to rise above the ground upon encountering an obstruction such as a stone or root or any immovable object and thereafter immediately and automatically re-enter the ground.

It is an object of this invention to provide such a machine in which the shovels have such a range of movement that they can be adjusted to any desired depths and can be elevated to a suitable height above the ground for turning the machine around or for transport from place to place.

Another object of my invention is to provide a depth placement machine which automatically places a layer of dirt between the fertilizer and the seeds deposited in the ground.

With these and other objects in view which will become apparent as the description proceeds, this invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 1 is a fragmentary top plan view showing substantially one-half of a depth placement machine incorporating the principles of my invention, with parts of said machine broken away;

Figure 2 is a longitudinal sectional view of the machine taken upon the line 2—2 of Figure 1, the shovels being shown in the lowered position;

Figure 3 is a sectional view similar to Figure 2, except that the shovels are shown in the raised position;

Figure 4 is an enlarged, fragmentary sectional view taken upon the line 4—4 of Figure 1;

Figure 5 is a fragmentary view taken upon the line 5—5 of Figure 4;

Figure 6 is a quasi-diagrammatic view illustrating the operation of a shovel;

Figure 7 is an enlarged sectional view taken upon the line 7—7 of Figure 6;

Figure 8 is a sectional view taken upon the line 8—8 of Figure 4 and further enlarged;

Figure 9 is a fragmentary side view showing alternate arrangements of a wheel, for a purpose described below; and Figure 10 is a fragmentary view of a cultivator attachment for use with my apparatus.

In referring now to the drawing, and particularly Figures 1 and 2 thereof, there is shown a depth placement machine comprising a frame 9 which is supported upon a pair of wheels 10, only one of which is shown.

The wheels 10 are preferably mounted upon stub shafts 11 (Figure 4) which are mounted in adjustable bearing plates 12 upon the vertical frame member 9c forming part of the frame 9. Advantageously, the wheels 10 can be mounted on either side of the vertical frame member 9c as shown in Figure 9. In this way the clearance between the wheels may be adjusted for different crop row spacings.

A pair of spaced horizontal cross beams or bars 13 are suitably supported upon the horizontal frame members 9a. The bars 13 serve as supports for furrow making mechanism, as will presently appear.

Triangular unit frames 15 are suspended from and below the bars 13 by at least two U-shaped, laterally facing clips 14 attached to one side of each frame. These frames 15 can be attached or removed by an endwise movement to engage or disengage the clips with the bars 13 and the clips can be retained in place by removable wedges 16. These frames 15 can be spaced as desired upon the bars 13, while the number of frames 15 spaced along the bars 13 may also be varied. In this way the number and spacing of the furrows made by the machine may be pre-determined since the frames 15 support the furrow making mechanism described below. One side 15a of each frame 15 faces downwardly and rearwardly of the machine, in an inclined position.

Adjacent the ends of the side 15a of each supporting bracket 15, are bearing lugs 17 and 17a. A link 18 is pivoted at one end to the lug 17, and a link 19 is pivoted to the bearing lug 17a. The link 18 is slightly longer than the link 19. Both links are backwardly-downwardly inclined in all operative positions. The free ends of the links 18 and 19 are pivotally connected to the shank 20 of a shovel unit 21 by the pivots 22 and 23 which are spaced apart but slightly closer together than the pivots 17b upon the lugs 17 and 17a. Both links 18 and 19 act as drag bars in a manner generally known from the prior art but improved in detail. That is, these links are raised from a freely hanging position and displaced toward the back of the machine, in all operative positions of the shovel. Thus the weight of these links and of the shovel unit hanging thereon tends to lower the shovel unit. Forward traveling of the machine, with the shovel unit embedded in the ground, basically tends to swing both links 18 and 19 further backward and thereby to raise them with the shovel unit, subject however to downwardly loading forces as follows:

Downward spring loading of each shovel 21 is accomplished by a compression spring 24 which surrounds the rod 24a, the lower end of which is adjustably secured to the shank 20 of shovel 21 by means of a pivoted bracket 24b and two nuts 24d. The upper end of the spring 24 abuts against an angle bar 25, hydraulically held in place as will be described. The upper end of the rod 24a is inserted through the hole 26a of attaching lug 26 which is mounted on the horizontal angle bar 25, and is retained for sliding movement through the hole 26a by the rod end knob 24c. An adjusting nut 24e is provided at the lower end of the spring 24 to vary the preloading of the spring and thereby, to meet certain soil conditions.

Referring now to Figures 2 and 6, it will be noted that the shovel 21 has a slight rearward inclination, tending to oppose the downward forces mainly in the event that the shovel 21 strikes a heavy rock or obstruction. Should this occur, the shovel 21 immediately rotates away from said obstruction and moves upwardly against spring 24, causing the upper end of the rod 24a to slide upwardly through the hole 26a in the attaching lug 26. Upon clearing the obstruction, the shovel 21 immediately descends through the action of spring 24 and automatically digs into the soil to the preset depth, to resume its furrow working function.

Furthermore downward loading is aided by the linkage 18, 19, etc. At least until a heavy obstruction is met the construction as shown and described causes a component of the force pulling the apparatus parallel to the ground, to be effective in driving the shovel 21 into the ground to a pre-determined depth. This will be understood when it is considered that the force pulling the shovel 21 to the left as seen in Figure 2 tends to rotate the shank 20 of the shovel about the pivot 22 in a counterclockwise direction. Such a tendency acts to lower the shovel unit, as most clearly shown in Figure 6. Therefore so long as operating conditions remain substantially those for which the spring 24 has been adjusted the forward travel of the machine aids the weight of the shovel unit and the spring 24 in keeping the shovels at their lower limit, established by the angle bar 25 and rod 24a. Hence the improved structure avoids the need for downwardly loading the shovels 21 with heavy springs, weights or the like to keep them from rising to the surface, even in the presence of the aforementioned rising tendency due to the backward inclination of the shovel. In actual field tests, using only light compression springs 24, it has been observed that if the apparatus is pulled forward the shovels 21 automatically dig into the soil to the full depth to which they have been preset and remain at that depth.

In other words each system of frame side 15a, links 18, 19 and shank member 20 forms a trapezium with rearwardly sloping and converging (forwardly diverging) sides 18 and 19 of substantially different lengths, a wide base 15a and an extremely short base 20. This trapezium-shaped linkage compensates for the rising tendency caused by ground obstructions encountered incident to forward travel of the frame. Said rising tendency is due to said backward-rearward inclination of the front surface of the shoe 21 on the shank 20. On the other hand the rearward converging of the sides 18, 19 and the consequent relative flatness of the lower and longer side 18 and steepness of the upper and shorter side 19 makes any rising of the system 18, 19 and 20 possible only together with a clockwise rotation of the shank 20 about the lower pivot 22; and this would tend to move the shoe 21 forward, that is to oppose the ground obstruction.

Each shank 20 of a shovel 21 carries a socket 27 for receiving the lower end of a flexible tube 28 which extends to the mouth 29 of a fertilizer hopper 30 extending across the machine. The upper end of each tube 28 is provided with a funnel 31 for receiving fertilizer from the hopper and depositing the same in the narrow furrow formed by the shovel 21.

The rear end of each socket 27 has a plate 32 extending therefrom to which a seed shovel 33 is adjustably attached. The seed shovel 33 is provided with a bracket 34 having a series of bolt holes 34a, while the plate 32 has a longer series of holes 35. As a result, the seed shovel 33 may be vertically adjusted to a deeper or shallower depth with respect to the ground, so that the seeds may be planted at the desired depths which can be varied as desired. A flexible tube 36 is attached to each socket 33a and includes a funnel portion 36a which extends into communication with an outlet 37 of a seed hopper 38 supported at the rear of the fertilizer hopper 30.

From the foregoing, it will be apparent that the shovel unit 21, the socket 27 and the seed shovel 33 are connected together and supported by the shank 20 and constitute a unit, and that each such unit is supported by a unit frame 15. In the event that the seeding means are not desired, they may be omitted whereby the unit will be reduced to the shovel 21 and the tube socket 27. It will accordingly be understood that the term unit as herein used may embrace only the shovels 21 for making the rows and the fertilizer distributor socket 27, or may also include the seeding means.

In the present instance, a plurality of shoe units are shown upon the illustrated half of the machine, and each unit is connected by a rod 24a to the attaching lug 26 mounted on angle bar 25. The arms of a yoke 39 are secured to the angle bar 25 and the apex of this yoke 39 has a downwardly extending arm 39a which is pivoted to a frame member as indicated at 39b. A stop lug 39c on the frame member limits the elevating movements of the yoke and shovels. The upper end of the yoke 39 is pivoted to a piston rod 40 extending into a double acting hydraulic cylinder 41, a clevis 42 being preferably used to connect the yoke 39 to the piston rod 40. A threaded rod 43 is secured to and extends from the rear end of the hydraulic cylinder 41 and passes through a double flanged nut 44, which is rotatably mounted in the U-shaped upright 45 which is carried by the bracket 46. A retainer strap 46a prevents the nut 44 from working out of the upright 45, and at the same time provides sufficient clearance to allow the cylinder 41 to swing from the position shown in Figure 2 to the position of Figure 3. By adjusting the double flanged nut 44 along the threaded rod 43, the depth of penetration of the shovel 21 can be regulated, since the null position of the yoke 39 is changed. Each shoe 21 can of course be separately adjusted to vary the depth of penetration by adjusting the nut 24e and also the nuts 24d securing the lower end of rod 24b to the bracket 24b. Thus it is possible to simultaneously vary the penetration of all of the units controlled by the hydraulic cylinder 41 or to vary the penetration of a single unit.

The machine is adapted to distribute fertilizer as it is propelled. For this purpose, an agitator shaft 51 is mounted in the fertilizer hopper 30, and carries a sprocket wheel 52 at one end (Figure 8) which is drivably connected to a sprocket wheel 53 upon shaft 11 by means of a sprocket chain 54. As a result, when the shaft 11 rotates during the operation of the planter, the agitator shaft 51 and the material agitating and dispensing members 50 mounted thereon are rotated. The manner in which the agitating and dispensing members 50 coact to pulverize and dispense material placed in the hopper 30 is explained in detail in the patent to E. A. Juzwiak, Patent No. 2,510,231.

In referring to Figures 5 and 8, it will be noted that the shaft 51 carries a bearing sleeve 55 at its end, which sleeve is fixed to the shaft by a pin 56, the ends of which project beyond the sleeve 55. A clutch member 57 surrounds the sleeve 55 and has slots 58 for receiving the projecting ends of the pin 56. The inner end of the clutch sleeve 57 has a clutch face 57a which is drivably engageable with a clutch face 52a upon the adjacent end of the hub of the sprocket wheel 52. A coil spring 59 between the end of the clutch sleeve 57 and a collar 55a on the sleeve 55 serves to urge the clutch sleeve 57 into operative relation with the sprocket wheel 52. Inwardly of the sprocket wheel 52, there is a gear 60 which is secured to the shaft 51 and which meshes with an idler gear 61 suitably journalled upon the fertilizer hopper frame and which idler gear 61 meshes with a gear 62 on the agitator shaft 63 of the seeding hopper 38. The mechanical details and operation of this seeding apparatus are set forth in my co-pending patent application Serial No. 175,766, filed July 25, 1950, now Patent No. 2,661,124, and entitled Seeder and Planter Apparatus.

In referring now to Figure 4, there is shown an L-shaped lever 65 pivoted to the frame as indicated at 66 and having a lost motion connection at its upper end with a link 67. This lost motion connection is best seen in Figures 4 and 5 and comprises an eyelet 65a on the lever 65 and an abutment on the link 67 designated as 67a. The link 67 is pivotally connected by pivot means 68a with a lever 68 which is pivoted at its lower end to a frame member as indicated at 69 and which is secured at its upper end to the angle bar 25 as indicated at 70 in Figure 1. The lever 65 is provided with a cam 71 best shown in Figure 5 which lies in the path of an arcuate lug 72 on the clutch sleeve 57 when the lever 65 is released upon the elevation of the shovels 21. That is, when the shovels 21 are in the lowered or operating position as shown in Figure 2, the abutment 67a will have shifted lever 65 to the left as seen in Figure 4 and out of the sphere of the lug 72. However, when angle bar 25 is elevated through the operation of the yoke 39 to elevate lever 68, the abutment 67a returns to the right (Figure 4) and the spring 73 which connects lever 65 with the hopper frame swings the lever 65 into the path of lug 72, which on engagement with the cam 71 causes the clutch sleeve 57 to move outwardly (i. e. to the right as viewed in Figures 5 and 8) to disconnect the clutch. Thus when the shovel units are elevated the gear 52 is immediately and automatically declutched with respect to the shaft 51. This latter feature is highly desirable, since certain types of fertilizers tend to set up when agitated, particularly when none of the fertilizer is being dispensed through the discharge ports provided.

In order to adjust the tension on the sprocket chain 54, the bearing plate 12 is made rectangular with its four side edges 12a, 12b, 12c and 12d at different distances from the center of the bearing aperture. The distances preferably increase progressively from one edge to the next. The vertical frame member 9c at the end of the machine is provided with a gauge lug 74 against which the top edge of the plate 12 is butted. Thus the position of the center of the shaft 11 is dependent upon which of the edges 12a, 12b, 12c and 12d contacts the lug 74.

In Figure 1, there is shown a hydraulic cylinder 75, the piston rod of which is connected to suitable linkage 77 and 77a for operating the shutter for the fertilizer hopper. This shutter or means for controlling the feed from the fertilizer hopper and the seed hopper has not been fully illustrated since any suitable means may be used, as disclosed in my co-pending application, Serial No. 175,766, now Patent No. 2,661,124.

By means of the hydraulic system to control the different parts of the machine, it becomes possible to use a single valve V (Figure 1) for simultaneously controlling said parts by a single operation. Thus by turning the valve to apply fluid pressure to the appropriate end of the double acting cylinders, the shovel units are elevated by cylinder 41, the fertilizer shutter is closed by cylinder 75 and the gear 52 and agitator 51 are then declutched as described.

To propel the machine, the frame may be provided with a suitable draw bar 78 for connection to a tractor or other motive force.

As best shown in Figures 6 and 7, each shovel 21 preferably has a rake 79 secured thereto, said rake being positioned, as shown, above the fertilizer distributor on the socket 27 and below the seed distributor outlet 33, to place a layer of dirt between the fertilizer and the seeds, as they are deposited in the ground by my apparatus. In this way the seeds are prevented from coming into intimate contact with the fertilizer. Otherwise the fertilizer might chemically attack and destroy or damage the seeds.

As shown in Figure 6, the side of each shovel blade 21 may be provided with a plurality of square holes 79a. The rake 79 may be fastened into one of said square holes by means of a square shank stud 79b. Thus the position of the rake 79 relative to the shovel 21 may be adjusted. For instance the rake 79 may be dragged over the surface of the ground without materially penetrating thereinto; the rake is then attached at the particular hole 79a which will accomplish this relative positioning of the parts. Thus in operation, the shovels 21 make a furrow, fertilizer is dropped into said furrow, after which the rakes 79 return at least part of the dislodged earth to partially fill said furrow. Thereafter the seed shovels 33 dig a shallower furrow in the earth which has just been replaced by the rakes 79; and the seeds are deposited in this latter furrow created by said shovels 33. Thus the fertilizer is always placed beneath the seeds, and separated therefrom by a layer of earth.

To use my new depth placement machine, the operator first sets the apparatus to give the desired rate, lateral spacing, absolute depth and relative depth of feed of fertilizer and seeds. The machine is then drawn forward by a tractor or other motive power, and when the operator desires to begin planting he merely actuates the hydraulic control V on the tractor. This (1) causes the shovels 21 to be lowered into the ground, (2) drivably connects the agitator shafts 51 and 63 to the wheel stub shafts 11, (3) moves the shutter mechanisms of the fertilizer hopper 30 to the open position, and (4) throws the seeder mechanism into operative position. Whenever the operator desires to discontinue placement of the seeds and fertilizer, he merely operates the hydraulic control V on the tractor and the aforesaid actions of the machine are reversed so as to disengage the shoe units and stop the flow of fertilizer and seeds.

Referring now to Figure 10, apparatus is shown which permits the conversion of my machine from a depth placement device to a cultivator. More particularly the shoe shank 20 is replaced by the adaptor unit 80, which includes a sheath 81. A cultivator member 82 is inserted through the sheath 81 and held in place by a stake 83. Like the shoe unit 21, the unit 80 slides out of the ground whenever a rock or other immovable object is encountered, but immediately digs into the ground as soon as the object is cleared.

It will be evident that the planting or cultivating units can be adjusted along the cross bars 13, 13 to obtain any desired spacing. And, by varying the positions of the holding clips, it becomes possible to stagger the shovels 21 or cultivator members 82 in two rows, if desired. This latter feature is desirable for the reason that it prevents the shovels 21 or members 82 from raking and collecting roots, stocks and other debris as the machine is drawn forward. It will also be apparent that the feature of connecting the shovels 21 or members 82 with the frame so that each can individually rise when an obstruction is encountered and then be caused to descend, constitutes an important advance in the art, especially from the standpoint of the simple way that it is accomplished.

Another desirable feature resides in the fact that the rows and the fertilizer distribution and the seeding are simultaneously performed and that the depth of the seeding can be varied to obtain any desirable depth, with respect to the distributed fertilizer. It should be understood that the shovels are so designed that they open only a very narrow furrow which closes almost completely when the shovel units pass. In addition, each shovel is independently adjustable as to depth of penetration.

With my invention, therefore, it is possible to distribute the fertilizer to the proper depth for the best result, and it is possible to deposit the seeds at the desired or best depths for obtaining the best results.

I am aware that many changes may be made and various details of construction may be modified without departing from the principles of this invention so I do not propose limiting the patent granted otherwise than necessitated by the appended claims.

I claim:

1. An agricultural depth control mechanism comprising a ground engaging tool with an upstanding shank; a frame to support said tool; means to move said frame forwardly above and along the ground; and linkage for said tool comprising a pair of drag bars depending from said frame and rearwardly converging toward and superimposed above one another, said drag bars being individually pivoted to the frame and shank, the upper drag bar being substantially shorter than the lower one, and said tool having a rearwardly-downwardly inclined front surface.

2. An agricultural depth control mechanism comprising a hollow furrow opener with an upstanding shank; means to supply said hollow furrow opener with material to be planted; a frame to support said furrow opener; means to move said frame forwardly above and along the ground; and control means for said furrow opener comprising a pair of rearwardly converging drag bars depending from said frame and individually pivoted to the frame and shank at superposed points, the upper drag bar being appreciably shorter than the lower one, and said furrow opener having a rearwardly sloping front surface.

3. An agricultural distributor and depth control mechanism comprising a furrow opener, a first hollow shoe and a second hollow shoe, said opener and shoes being longitudinally aligned with one another and rigidly mounted on a common upstanding shank; a unit frame longitudinally aligned with said shank above the ground; means to move said frame along the ground in a forward direction; means to feed fertilizer to one of said shoes and seed to the other; and a pair of drag bars forming a quadrangle with said frame and shank, in a substantially vertical plane and with pivots at the corners, the upper drag bar being much shorter than the lower one and diverging therefrom in said direction, and said furrow opener having a front surface inclined rearwardly and downwardly.

4. An agricultural distributor and depth control mechanism comprising a forwardly movable wheel supported frame; separate fertilizer and seed supply means on said frame, an upper relatively short drag bar pivoted to said frame, a lower drag bar separately pivoted to said frame, a rigid and extremely short shank pivoted to said drag bars and forming therewith a trapezium lying in a vertical plane, a furrow opener rigidly secured to the bottom of said shank and having a backwardly sloping front, seed and fertilizer distributor shoes rigidly secured to the bottom of said shank and flexibly connected respectively with said supply means, and a harrow interposed between said shoes and rigidly secured to the bottom of said shank.

References Cited in the file of this patent

UNITED STATES PATENTS

| Number | Name | Date |
|---|---|---|
| 556,344 | Fuller | Mar. 17, 1896 |
| 694,499 | Smith | Mar. 4, 1902 |
| 721,335 | Smethers | Feb. 24, 1903 |
| 770,372 | Lake et al. | Sept. 20, 1904 |
| 1,082,072 | Davis | Dec. 23, 1913 |
| 1,124,695 | Campbell | Jan. 12, 1915 |
| 1,128,324 | Jones | Feb. 16, 1915 |
| 1,405,001 | Reichelt | Jan. 31, 1922 |
| 1,413,353 | Phillips | Apr. 18, 1922 |
| 1,426,173 | Fuegel et al. | Aug. 15, 1922 |
| 1,464,130 | Ferguson | Aug. 7, 1923 |
| 1,657,024 | Morse | Jan. 24, 1928 |
| 1,809,018 | Bruning | June 9, 1931 |
| 1,837,895 | Chambers | Dec. 22, 1931 |
| 1,842,059 | Alegria | Jan. 19, 1932 |
| 1,921,886 | Kriegbaum et al. | Aug. 8, 1933 |
| 2,159,652 | Brunner | May 23, 1939 |
| 2,190,359 | Hipple | Feb. 13, 1940 |
| 2,207,087 | Chaney | July 9, 1940 |
| 2,210,994 | White | Aug. 13, 1940 |
| 2,239,918 | Kriegbaum | Apr. 29, 1941 |
| 2,259,864 | Smith | Oct. 21, 1941 |
| 2,315,204 | Holle | Mar. 30, 1943 |
| 2,320,169 | Benjamin | May 25, 1943 |
| 2,332,743 | Morris | Oct. 26, 1943 |
| 2,358,532 | Orendorff | Sept. 19, 1944 |
| 2,375,850 | Johnson | May 15, 1945 |
| 2,413,807 | Warne | Jan. 7, 1947 |
| 2,430,741 | Smith | Nov. 11, 1947 |
| 2,521,631 | Griffiths | Sept. 5, 1950 |
| 2,649,725 | Oehler et al. | Aug. 25, 1953 |